US011952308B2

(12) United States Patent
Aguilar Cartagena

(10) Patent No.: US 11,952,308 B2
(45) Date of Patent: Apr. 9, 2024

(54) PROCESS FOR THE TRANSFORMATION OF ANTIMICROBIAL GLAZED MATERIAL

(71) Applicant: Materiales Avanzados SpA, Valparaiso (CL)

(72) Inventor: Christian Marcel Aguilar Cartagena, Valparaiso (CL)

(73) Assignee: MATERIALES AVANZADOS SPA, Valparaiso (CL)

( * ) Notice: Subject to any disclaimer, the term of this patent is extended or adjusted under 35 U.S.C. 154(b) by 380 days.

(21) Appl. No.: 17/618,839

(22) PCT Filed: Jul. 27, 2020

(86) PCT No.: PCT/CL2020/050081
§ 371 (c)(1),
(2) Date: Dec. 17, 2021

(87) PCT Pub. No.: WO2020/248084
PCT Pub. Date: Dec. 17, 2020

(65) Prior Publication Data
US 2022/0356112 A1 Nov. 10, 2022

(30) Foreign Application Priority Data
Jun. 11, 2019 (CL) .................................. 1608-2019

(51) Int. Cl.
*C03C 17/34* (2006.01)
(52) U.S. Cl.
CPC ...... *C03C 17/3411* (2013.01); *C03C 2204/02* (2013.01); *C03C 2217/479* (2013.01)
(58) Field of Classification Search
CPC ............ C03C 2204/00; C03C 2204/02; C03C 11/002; C03C 21/005; C03C 21/008; A01N 59/20
USPC ........................................................ 427/331
See application file for complete search history.

(56) References Cited

U.S. PATENT DOCUMENTS

2017/0079807 A1* 3/2017 Wallenstein ............... A61F 2/44
2019/0264040 A1* 8/2019 Gilbert ..................... C09D 7/69

FOREIGN PATENT DOCUMENTS

| CL | 2012000506 A1 | | 11/2012 |
| CL | 2013001257 A1 | | 9/2013 |
| EP | 0565881 | * | 3/1993 |
| WO | 2016/028554 | * | 2/2016 |
| WO | 2016028554 A1 | | 2/2016 |

OTHER PUBLICATIONS

Gianluca Malavasi, et al., "Novel Smart Bio-Nanomaterials: Bioactive Glasses Containing Metal Nano-Particles Conjugated With Molecules of Biological Interest", NSTI—Nanotech, vol. 3, pp. 114-117, 2012.
Aminu Musa, et al., "Synthesis of Nanocrystalline Cellulose Stabilized Copper Nanoparticles", Journal of Nanomaterials, pp. 1-7, 2016.
International Search Report and Written Opinion for Corresponding International Application No. PCTCL2020/050081, dated Sep. 29, 2020 and English Translations.

* cited by examiner

*Primary Examiner* — Tabassom Tadayyon Eslami
(74) *Attorney, Agent, or Firm* — LUCAS & MERCANTI, LLP

(57) ABSTRACT

The process for transforming an industrial soda-lime-type base glass plate into a glazed material with antimicrobial properties and personalized color consists in an antimicrobial glazed material production process. Copper nanoparticles (NPCu) are added to said glass with the aim of directly altering cell protection against viruses and bacteria in order to destroy their genetic material. The antibacterial glass is specifically applied to the industrial sector of surfaces and covers that are usually used in hospital facilities, and covers for the handling of food and beverages, among other uses.

5 Claims, No Drawings

PROCESS FOR THE TRANSFORMATION OF ANTIMICROBIAL GLAZED MATERIAL

CROSS REFERENCE TO RELATED APPLICATION

This Application is a 371 of PCT/CL2020/050081 filed on Jul. 27, 2020, which claimed priority of Chilean Patent Application No. 1608-2019, filed Jun. 11, 2019, both of which are incorporated herein by reference.

TECHNICAL PROBLEM

According to the World Health Organization (WHO), hospital-acquired infections are present in all healthcare centers, on different continents, either as a daily reality or as a permanent threat and affecting between 5% and 10% of the population in developed countries and up to 25% in developing countries.

Foodborne illnesses (FBI) are an emerging problem. Aspects such as the globalization of markets and the complexity of the food chain make the availability of safe food an arduous task, especially in a world with significant levels of pathogens, allergens and pollutants.

According to the Revista Chilena de Infectologia, Vol. 29 No. 5, 504-510, October 2012; it is pointed out that in the United States, around 76 million people get sick each year from some kind of FBI; about 50% of these cases are home-based, of which 325,000 are hospitalized and 5,000 die. All this implies a significant economic cost within the expenses of the state's health budget.

Conversely, museums invest significant financial resources in active microorganism control systems. Inside museums and cultural heritage institutions, expensive vacuum and inert gas systems are used to preserve objects of historical value and prevent the proliferation of microorganisms, this is preferably done in the exhibition space. Currently, museums and conservation centers do not have passive systems to control the biodegradation of cultural property that act permanently and avoid or reduce the use of mechanical devices that can always alter or damage cultural property.

The market has offered antibacterial surface solutions, for example, with silver halides. The problem with these surfaces is that high concentrations of chemical compounds and resins are used in their manufacture, which are used as sealants and binders of the particulate material, these sealants and binders contain additives such as triclosan, banned in the European Commission since 2011. In this context, the artificial stone manufacturing industry has had to face large lawsuits due to the development of lung cancer and silicosis in its workers as a result of constant contact with these highly dangerous compounds. Additionally, the study by the Millennium Institute of Biomedical Neuroscience of the Faculty of Medicine of the University of Chile, published in 2018, released results that indicate that triclosan would be toxic to the nervous system and neurons, with previous findings describing toxicity damage to the liver, intestine, skeletal muscle and heart due to the use of triclosan.

Healthy lifestyles require products that permanently solve the proliferation of microorganisms at the food and/or clinical levels. Every year in Chile, 7,000 million US dollars are spent on additional bed days for patients who are associated with a health problem due to the contagion of a hospital-acquired disease.

Furthermore, during the year 2017, 1,042 outbreaks of FBI were registered, with 5,772 persons affected and a hospitalization rate of 0.47%, the main cause being food and foodstuffs prepared outside the home, with 34.6% of the total.

On the other hand, biofilms are formed from a group of bacteria that form a thin layer, adhering to different surfaces. Over time, they grow larger and can seriously affect health. In natural environments, 99% of all bacterial cells are found adhering to or forming biofilms on surfaces, and only 1% live as planktonic cells.

Pursuant to the background presented, the antibacterial solution must be developed for the work surfaces, as it is in this place where the colonies of bacteria and all kinds of microorganisms reproduce. According to this need, the present invention is a process that transforms an industrial glass plate coated with microglass and copper nanoparticles, consequently, it has the ability to become an antimicrobial surface due to the properties conferred by the copper nanoparticles to the surface.

As part of the optimization of the technology of the present invention, a process for manufacturing copper nanoparticles with 99.5% purity was developed from the process of reducing copper cations using ascorbic acid. The nanoparticles obtained were incorporated as raw material into the antimicrobial glass.

The technological development as a result of this process, has laboratory tests to count microorganisms, which managed to show that 99.9% of microorganisms die in a maximum of 24 hours if they are on these covers. In addition, there is the standardized detailed procedure to obtain the glass cover with microglass and copper nanoparticles incorporated, and a laboratory prototype of this glazed material has been developed, demonstrating its antimicrobial activity, placing it at a Technology Readiness Level (TRL) 4.

BACKGROUND ART

The United States Patent No. 2014 2014/0017462, now Patent: 9028962 develops an antimicrobial, antiviral and antifungal surface in touch screen cover glasses using copper nanoparticles on the glass surface by means of fluorosilane coating or other coatings to make surfaces easy to clean.

On the other hand, US Patent No. 2014/0079807, now abandoned creates a glass-based material that uses copper or silver properties and is incorporated in its manufacture; therefore, it is a feature not exclusive to its surface.

In addition, it is worth mentioning WO 2012084072 A1.

DESCRIPTION OF THE INVENTION

The present invention is a process for the transformation of float soda-lime glass in a laminar state (base glass or glass plate), into an antimicrobial glass by applying microglass, taking advantage of the copper nanoparticle qualities.

To transform a float glass layer into antimicrobial glass, the following raw materials are required:

Colorless or colored microglass, approximately 64 microns in size, with a coefficient of expansion of 80+−2. This ensures compatibility between the glass plate that is the base glass and the microglass. The fact that the glasses have the same coefficient of expansion enables compatibility between the components and that after the heating and subsequent cooling process, the mechanical stability of the antibacterial glazed material is maintained.

Copper nanoparticles obtained from the chemical reduction of hydrated copper sulfate using ascorbic acid as a reducer. This chemical reaction in aqueous medium is carried out at a controlled temperature in a heat stirring plate. Nanoparticles comprising a size range between 100 nanometers and 2 microns with spherical morphology are obtained.

Water-based nitrocellulose adhesive that allows the microglass and nanoparticles to be temporarily fixed to the surface of the base glass in the last transformation stage. The purpose is mainly to avoid that, due to previous manipulation, traces, marks and detachments of the materials are generated in previous processes of surface fixation by firing.

Float glass is a material obtained by a manufacturing method that provides the glass with a uniform thickness and a very flat surface, which is why it is the most used glass in construction. To achieve this flat and uniform surface, the glass is floated on a flotation pool with liquid tin. The process of the present invention is carried out on the face that was not in contact with the liquid tin in its flotation process since the traces of this material could interact with some of the components of this process and modify final results. To detect the "thin" layer or face contaminated by tin, a UV light lamp is used which, using raking light, generates a characteristic whitish effect that identifies the presence of this substance.

Once the base glass to be used is available, the following phases will continue:

A first colored substrate is applied to the chosen surface of the glass plate through a microglass solution dissolved in ethanol via atomization at a pressure not greater than 3.51 kg/cm$^2$ (50 psi) and is allowed to dry, A second colored substrate is applied through a sieve with dry microglass of the color of your choice, Copper nanoparticles dissolved in aqueous nitrocellulosic adhesive solution are applied via atomization at a pressure not greater than 3.51 kg/cm$^2$ (50 psi) to temporarily attach the microglass and the copper nanoparticles to the glass surface prior to their fixation by firing.

The furnace is conditioned by inserting a 3 mm insulating ceramic fiber sheet at its base that will prevent the base glass from adhering to the insulating bricks of the furnace.

The glass is fired through a heating process until it reaches a temperature between 800° C. and 850° C. Subsequently, the temperature is quickly lowered to 560° C. to avoid the devitrification of the glass, a condition that generates a loss of transparency in this material. If necessary, the furnace door and/or vents are opened to aid cooling.

The final cooling is carried out in phases, avoiding a rapid drop in temperature from the ranges of 560° C. to room temperature, since accelerated cooling can cause mechanical instability and/or spontaneous breakage.

Finally, after the firing stage, the resulting glass plate is machined and can be incorporated as an antibacterial coating and/or surface.

According to the morphological characterization carried out by SEM microscopy (scanning electron microscopy), the range of sizes of the particles obtained varies between 100 nanometers and 2 microns with spherical morphology.

Its elaboration is based on the incorporation, on its useful face, of a quantity of glass microparticles (colored or colorless) between the ranges of 40 pm to 60 pm in a variable percentage that translates between 500 and 700 grams per kilogram of base material glass. Following this step, copper nanoparticles with calibers between 100 nm and 2 pm are incorporated, in proportions that do not exceed 1% of nanoparticles with respect to the total weight of the surface.

The process achieves the obtaining of a coating material, which also includes laboratory validation, through microbiological analysis of the micro-organism count. From this, the high antimicrobial activity against microorganisms of the mesophilic anaerobic type and bacteria is realized.

Advantages of this Invention

Its main raw materials are easily obtained and affordable.

Copper nanoparticles are obtained from a suitable synthesis process with a low-cost organic activator.

Ease of technology transfer of the production process, since the same production line, machinery, logistics and raw material of a flat glass processor and/or manufacturer (glassmaking) can be used.

Surfaces with permanent antimicrobial action are a contribution to public health and heritage conservation.

More than 20 colors to customize the surface, high temperature firing allows for a solid surface without chemical agents, high resistance to hot objects and scratches, high resistance to bending without losing strength and hygiene qualities.

Example

A 1.0-meter×1.0-meter, 15 mm thick piece of industrial float glass is available. One of the edges of the glass is illuminated perpendicularly with an ultraviolet light detection lamp, the glass side that forms a whitish halo was in contact with liquid tin during its manufacturing process; this side is the one that will not be used in the process.

Place the glass plate on a clean work surface, preferably white and washable.

There is a previous design regarding the result to be obtained, understanding that there are more than 20 microglass colors that will be applied directly as a single color or different combinations, additive and/or subtractive sums from which a decorative surface will be obtained.

50 g of microglass in 100% ethanol are prepared. The coefficient of linear expansion of glass (COE) is 82+−2, compatible with float glass, 64 microns in size; for the application of this solution, a large nozzle atomization gun is used and an air pressure not greater than 3.51 kg/cm$^2$ (50 psi). In this process, the microglass is atomized with an atomization fan at an angle of 35°. It is allowed to dry completely.

For a square meter of glass, approximately 500 grams of microglass are used, therefore, 450 grams of microglass are separated that will be applied with a sieve and dry on the glass as a second layer; in this stage the aim is to achieve the planned effect according to the design. 20 g of powdered nitrocellulosic adhesive are dissolved in 100 distilled water, a transparent liquid is obtained that serves as a solution to add the copper nanoparticle in a proportion of weight not greater than 1% with respect to the weight of the glass, after an active stirring process, a solution is achieved that is applied with a large nozzle atomization gun and an air pressure not greater than 3.51 kg/cm$^2$ (50 psi). It is allowed to dry again and the microglass will be temporarily adhered to the glass, ready to start the firing process.

The electric melting furnace is covered at its base with 2 mm thick ceramic fiber, on which the glass plate that has been worked is placed, the furnace is closed, and the heating process begins.

In the first heating stage, the temperature is raised to 840° C. with a final stabilization of this temperature for approximately half an hour, by opening the furnace and with facial and eye protection the final state is verified; after checking, the heating resistances are switched off after a permanent check of the temperature, it is allowed to drop as quickly as possible, approximately 10° C. per minute up to 560° C. This rapid cooling stage prevents the glass from devitrifying (losing transparency).

In the last cooling stage, the temperature is stabilized at 560° C. for at least one hour and then it is allowed to cool slowly for a time at least 3 times the heating time, 24 hours.

After the cooling process, the resulting antimicrobial glass is washed, and the edges are cut, generally there is a 20% loss. The edges, perforations and all finishing machining are polished.

The invention claimed is:

1. A process for the transformation of an industrial soda-lime-type base glass plate into a glazed material with antimicrobial properties and personalized color, comprising the following stages:
   stage 1 comprising:
   a) selecting a glass plate face to use, detecting through a UV lamp the face that has been in contact with tin in its industrial stage;
   b) cleaning an uncontaminated face with a water-free solvent;
   stage 2 comprising:
   a) applying a microglass solution dissolved in ethanol to the cleaned surface of the glass plate via atomization at a pressure no greater than 3.51 kg/cm2 and allowing to dry to form a first colored layer,
   b) forming a second colored layer by applying dry colored microglass through a sieve;
   c) applying copper nanoparticles dissolved in an aqueous nitrocellulosic adhesive solution via atomization at a pressure no greater than 3.51 kg/cm2 thereby temporarily fixing the microglass layers and the copper nanoparticles to the glass plate face prior to their fixation by firing to obtain a prepared glass plate;
   stage 3 comprising:
   introducing the prepared glass plate from stage 2 into an electric type furnace with superior heating resistances on a refractory ceramic fiber base to heat the glass plate surface at temperature ranges of 800° C.-900° C., and stabilizing said temperature range for a time not exceeding 40 minutes to obtain a glazed surface;
   stage 4 comprising:
   a) cooling the glazed surface in 3 cycles comprising:
   cycle 1: lowering the temperature rapidly to a temperature not less than 560° C.,
   cycle 2: stabilizing the temperature at 560° C. for a period of time between 30 and 120 minutes,
   cycle 3: carrying out controlled cooling from 560° C. to room temperature, for a time at least 3 times longer than the time that was used to heat the glass plate during stage 3 thereby obtaining a mechanically stable glazed material without internal stresses,
   stage 5 comprising:
   cutting the stable glazed material obtained from stage 4 to size, polishing edges, and machining as required.

2. The process according to claim 1, wherein a glazed surface that has antimicrobial properties is obtained by applying microglass with a coefficient of expansion (COE 82+−3) and copper nanoparticles via vitrofusion and personalized color for decoration of its surface.

3. A method for coating vertical or horizontal faces of a decorative glass, by permanently eliminating the presence of microorganisms, such as *Escherichia coli, Listeria monocytogenes*, Streptococci and *Aspergillus* that are found non-planktonically adhered to surfaces in kitchens, bathrooms, laboratories and any space by applying a glazed material obtained according to the process of claim 2.

4. The process according to claim 1, wherein a glazed material with 3 heat-fused layers obtained, and one of the layers which contains copper nanoparticles is antimicrobially active.

5. The process according to claim 1, wherein the copper nanoparticles are integrated between the 2 layers of microglass on the glass plate and during heating process the microglasses decreases their viscosity and becomes malleable, and facilitating the adhesion of the copper nanoparticles.

* * * * *